United States Patent
Dalal et al.

(10) Patent No.: US 9,436,638 B1
(45) Date of Patent: *Sep. 6, 2016

(54) FULL BANDWIDTH PACKET HANDLING WITH SERVER SYSTEMS INCLUDING OFFLOAD PROCESSORS

(71) Applicant: Xockets, Inc., San Jose, CA (US)

(72) Inventors: Parin Bhadrik Dalal, Milpitas, CA (US); Stephen Paul Belair, Santa Cruz, CA (US)

(73) Assignee: Xockets, Inc., San Jose, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 13/931,905

(22) Filed: Jun. 29, 2013

Related U.S. Application Data

(60) Provisional application No. 61/753,892, filed on Jan. 17, 2013, provisional application No. 61/753,895, filed on Jan. 17, 2013, provisional application No. 61/753,899, filed on Jan. 17, 2013, provisional application No. 61/753,901, filed on Jan. 17, 2013, provisional application No. 61/753,903, filed on Jan. 17, 2013, provisional application No. 61/753,904, filed on Jan. 17, 2013, provisional application No. 61/753,906, filed on Jan. 17, 2013, provisional application No. 61/753,907, filed on Jan. 17, 2013, provisional application No. 61/753,910, filed on Jan. 17, 2013.

(51) Int. Cl.
*G06F 13/00* (2006.01)
*G06F 13/40* (2006.01)
*G06F 15/16* (2006.01)
*H04L 29/08* (2006.01)
*G06F 13/16* (2006.01)

(52) U.S. Cl.
CPC ............ *G06F 13/4022* (2013.01); *G06F 13/16* (2013.01); *G06F 15/161* (2013.01); *H04L 29/08549* (2013.01)

(58) Field of Classification Search
None
See application file for complete search history.

(56) References Cited

U.S. PATENT DOCUMENTS 5,237,662 A   8/1993   Green et al.
5,247,675 A   9/1993   Farrell et al.
(Continued)

FOREIGN PATENT DOCUMENTS

WO   2011120019 A2   9/2011
WO   2012141694 A1   10/2012

OTHER PUBLICATIONS

PCT International Search Report for International Application PCT/US2013/047205, dated Sep. 24, 2013.
(Continued)

*Primary Examiner* — Idriss N Alrobaye
*Assistant Examiner* — Dayton Lewis-Taylor

(57) ABSTRACT

An inter-rack server system for a packet processing is disclosed. The system can include a plurality of servers arranged into multiple racks a plurality of top of rack (TOR) units connected to the servers, each TOR unit configured to operate as a TOR switch connecting each of the racks to another of the racks, and a plurality of offload processor modules, each offload processor module having an input-output (IO) port and multiple offload processors, wherein a first offload processor module on a first server on a first rack is connected directly to a second offload processor module on a second server on a second rack, with connection provided through respective IO ports.

14 Claims, 5 Drawing Sheets

(56) References Cited

U.S. PATENT DOCUMENTS

| | | | |
|---|---|---|---|
| 5,577,213 A | 11/1996 | Avery et al. | |
| 5,870,350 A | 2/1999 | Bertin et al. | |
| 6,092,146 A | 7/2000 | Dell et al. | |
| 6,157,955 A | 12/2000 | Narad et al. | |
| 6,330,658 B1 | 12/2001 | Evoy et al. | |
| 6,751,113 B2 | 6/2004 | Bhakta et al. | |
| 6,810,442 B1 | 10/2004 | Lin et al. | |
| 6,873,534 B2 | 3/2005 | Bhakta et al. | |
| 6,877,076 B1 | 4/2005 | Cho et al. | |
| 6,930,900 B2 | 8/2005 | Bhakta et al. | |
| 6,930,903 B2 | 8/2005 | Bhakta et al. | |
| 7,062,618 B2 | 6/2006 | Tsunoda et al. | |
| 7,089,412 B2 | 8/2006 | Chen et al. | |
| 7,254,036 B2 | 8/2007 | Pauley et al. | |
| 7,286,436 B2 | 10/2007 | Bhakta et al. | |
| 7,289,386 B2 | 10/2007 | Bhakta et al. | |
| 7,305,574 B2 | 12/2007 | Ferraiolo et al. | |
| 7,375,970 B2 | 5/2008 | Pauley et al. | |
| 7,421,552 B2 | 9/2008 | Long | |
| 7,442,050 B1 | 10/2008 | Bhakta et al. | |
| 7,454,749 B2 | 11/2008 | Oberdorfer | |
| 7,467,251 B2 | 12/2008 | Park et al. | |
| 7,472,205 B2 | 12/2008 | Abe | |
| 7,480,611 B2 | 1/2009 | Gooding et al. | |
| 7,532,537 B2 | 5/2009 | Solomon et al. | |
| 7,619,893 B1 | 11/2009 | Yu | |
| 7,619,912 B2 | 11/2009 | Bhakta et al. | |
| 7,636,274 B2 | 12/2009 | Solomon et al. | |
| 7,716,035 B2 | 5/2010 | Oshins et al. | |
| 7,716,411 B2 | 5/2010 | Panabaker et al. | |
| 7,811,097 B1 | 10/2010 | Bhakta et al. | |
| 7,839,645 B2 | 11/2010 | Pauley et al. | |
| 7,840,748 B2 | 11/2010 | Gower et al. | |
| 7,864,627 B2 | 1/2011 | Bhakta et al. | |
| 7,881,150 B2 | 2/2011 | Solomon et al. | |
| 7,904,688 B1 | 3/2011 | Kuo et al. | |
| 7,916,574 B1 | 3/2011 | Solomon et al. | |
| 8,001,434 B1 | 8/2011 | Lee et al. | |
| 8,033,836 B1 | 10/2011 | Bhakta et al. | |
| 8,054,832 B1 | 11/2011 | Shukla et al. | |
| 8,072,837 B1 | 12/2011 | Solomon et al. | |
| 8,081,535 B2 | 12/2011 | Bhakta et al. | |
| 8,081,536 B1 | 12/2011 | Solomon et al. | |
| 8,081,537 B1 | 12/2011 | Bhakta et al. | |
| 8,117,369 B2 | 2/2012 | Nishtala et al. | |
| 8,154,901 B1 | 4/2012 | Lee et al. | |
| 8,190,699 B2 | 5/2012 | Mcmillian et al. | |
| 8,264,903 B1 | 9/2012 | Lee et al. | |
| 8,287,291 B1 | 10/2012 | Bhakta et al. | |
| 8,301,833 B1 | 10/2012 | Chen et al. | |
| 8,347,005 B2 | 1/2013 | Bresniker | |
| 8,359,501 B1 | 1/2013 | Lee et al. | |
| 8,417,870 B2 | 4/2013 | Lee et al. | |
| 8,489,837 B1 | 7/2013 | Lee | |
| 8,516,185 B2 | 8/2013 | Lee et al. | |
| 8,516,187 B2 | 8/2013 | Chen et al. | |
| 8,516,188 B1 | 8/2013 | Solomon et al. | |
| 8,553,470 B2 | 10/2013 | Lee et al. | |
| 8,555,002 B2 | 10/2013 | Karamcheti et al. | |
| 8,599,634 B1 | 12/2013 | Lee et al. | |
| 8,631,193 B2 | 1/2014 | Smith et al. | |
| 8,656,072 B2 | 2/2014 | Hinkle et al. | |
| 8,689,064 B1 | 4/2014 | Lee et al. | |
| 8,756,364 B1 | 6/2014 | Bhakta et al. | |
| 8,775,858 B2 | 7/2014 | Gower et al. | |
| 8,782,350 B2 | 7/2014 | Lee et al. | |
| 8,782,373 B2 | 7/2014 | Karamcheti et al. | |
| 8,787,060 B2 | 7/2014 | Lee | |
| 8,864,500 B1 | 10/2014 | Bhakta et al. | |
| 8,868,829 B2 | 10/2014 | Rajan et al. | |
| 8,874,831 B2 | 10/2014 | Lee et al. | |
| 8,874,843 B2 | 10/2014 | Okin et al. | |
| 8,881,389 B2 | 11/2014 | Kanapathippilai et al. | |
| 8,904,098 B2 | 12/2014 | Amidi et al. | |
| 8,924,680 B2 | 12/2014 | Perego et al. | |
| 8,930,647 B1 | 1/2015 | Smith | |
| 8,943,245 B2 | 1/2015 | Karamcheti et al. | |
| 2002/0181450 A1 | 12/2002 | Sokol et al. | |
| 2004/0093477 A1 | 5/2004 | Oberdorfer | |
| 2004/0148420 A1 | 7/2004 | Hinshaw et al. | |
| 2004/0202319 A1 | 10/2004 | Hussain et al. | |
| 2005/0018495 A1 | 1/2005 | Bhakta et al. | |
| 2005/0078708 A1* | 4/2005 | Bender | H04L 49/3009 370/475 |
| 2005/0120160 A1 | 6/2005 | Plouffe et al. | |
| 2005/0226238 A1 | 10/2005 | Hoskote et al. | |
| 2005/0240745 A1 | 10/2005 | Iyer et al. | |
| 2006/0004965 A1 | 1/2006 | Tu et al. | |
| 2007/0079185 A1 | 4/2007 | Totolos | |
| 2007/0124532 A1 | 5/2007 | Bennett et al. | |
| 2007/0226745 A1 | 9/2007 | Haas et al. | |
| 2007/0299990 A1 | 12/2007 | Ben-yehuda et al. | |
| 2008/0040551 A1 | 2/2008 | Gray et al. | |
| 2008/0229049 A1 | 9/2008 | Nanda et al. | |
| 2008/0259555 A1 | 10/2008 | Bechtolsheim et al. | |
| 2008/0304481 A1 | 12/2008 | Gurney et al. | |
| 2009/0138440 A1 | 5/2009 | Goyal | |
| 2009/0187713 A1 | 7/2009 | Zedlewski et al. | |
| 2009/0201711 A1 | 8/2009 | Solomon et al. | |
| 2010/0091540 A1 | 4/2010 | Bhakta et al. | |
| 2010/0110642 A1 | 5/2010 | Pauley et al. | |
| 2010/0128507 A1 | 5/2010 | Solomon et al. | |
| 2010/0183033 A1 | 7/2010 | Hannuksela | |
| 2011/0016250 A1 | 1/2011 | Lee et al. | |
| 2011/0022818 A1 | 1/2011 | Kegel et al. | |
| 2011/0085406 A1 | 4/2011 | Solomon et al. | |
| 2011/0090749 A1 | 4/2011 | Bhakta et al. | |
| 2011/0099317 A1 | 4/2011 | Nishtala et al. | |
| 2011/0110376 A1 | 5/2011 | Jiang | |
| 2011/0154318 A1 | 6/2011 | Oshins et al. | |
| 2011/0202679 A1 | 8/2011 | Cohen et al. | |
| 2011/0211444 A1 | 9/2011 | Das et al. | |
| 2011/0235260 A1 | 9/2011 | Lee et al. | |
| 2011/0296440 A1 | 12/2011 | Laurich et al. | |
| 2012/0027018 A1 | 2/2012 | Ilyadis | |
| 2012/0047126 A1 | 2/2012 | Branscome et al. | |
| 2012/0079209 A1 | 3/2012 | Zhou et al. | |
| 2012/0079352 A1 | 3/2012 | Frost et al. | |
| 2012/0096211 A1* | 4/2012 | Davis | H04L 49/40 710/314 |
| 2012/0106228 A1 | 5/2012 | Lee | |
| 2012/0192191 A1* | 7/2012 | Jellinek | G06F 9/5044 718/102 |
| 2012/0239874 A1 | 9/2012 | Lee et al. | |
| 2012/0250386 A1 | 10/2012 | Lee et al. | |
| 2012/0250682 A1 | 10/2012 | Vincent et al. | |
| 2012/0271990 A1 | 10/2012 | Chen et al. | |
| 2012/0331268 A1 | 12/2012 | Konig et al. | |
| 2013/0003556 A1 | 1/2013 | Boden et al. | |
| 2013/0019057 A1 | 1/2013 | Stephens | |
| 2013/0019076 A1 | 1/2013 | Amidi et al. | |
| 2013/0039128 A1 | 2/2013 | Amidi et al. | |
| 2013/0086309 A1 | 4/2013 | Lee et al. | |
| 2013/0132639 A1 | 5/2013 | Amidi et al. | |
| 2013/0262739 A1 | 10/2013 | Bennett et al. | |
| 2014/0040568 A1 | 2/2014 | Lee et al. | |
| 2014/0040569 A1 | 2/2014 | Solomon et al. | |
| 2014/0075106 A1 | 3/2014 | Okin et al. | |
| 2014/0281661 A1 | 9/2014 | Milton et al. | |
| 2014/0337539 A1 | 11/2014 | Lee et al. | |
| 2015/0070959 A1 | 3/2015 | Lee | |

OTHER PUBLICATIONS

PCT Written Opinion of the International Search Authority for International Application PCT/US2013/047205, dated Sep. 24, 2013.

PCT International Search Report for International Application PCT/US2013/047217, dated Jan. 29, 2014.

PCT Written Opinion of the International Search Authority for International Application PCT/US2013/047217, dated Jan. 29, 2014.

PCT International Search Report for International Application PCT/US2013/046417, dated Dec. 23, 2013.

(56) References Cited

OTHER PUBLICATIONS

PCT Written Opinion of the International Search Authority for International Application PCT/US2013/046417, dated Dec. 23, 2013.
PCT International Search Report for International Application PCT/US2013/044856, dated Feb. 10, 2014.
PCT Written Opinion of the International Search Authority for International Application PCT/US2013/044856, dated Feb. 10, 2014.
PCT International Search Report for International Application PCT/US2013/044857, dated Feb. 10, 2014.
PCT Written Opinion of the International Search Authority for International Application PCT/US2013/044857, dated Feb. 10, 2014.
PCT International Search Report for International Application PCT/US2013/048013, dated Jan. 17, 2014.
PCT Written Opinion of the International Search Authority for International Application PCT/US2013/048013, dated Jan. 17, 2014.
PCT International Search Report for International Application PCT/US2013/042284, dated Nov. 26, 2013.
PCT Written Opinion of the International Search Authority for International Application PCT/US2013/042284, dated Nov. 26, 2013.
PCT International Search Report for International Application PCT/US2013/042279, dated Jan. 22, 2014.
PCT Written Opinion of the International Search Authority for International Application PCT/US2013/042279, dated Jan. 22, 2014.
PCT International Search Report for International Application PCT/US2013/042274, dated Dec. 6, 2013.
PCT Written Opinion of the International Search Authority for International Application PCT/US2013/042274, dated Dec. 6, 2013.
Office Action dated Aug. 18, 2015 for U.S. Appl. No. 13/931,903.
Office Action dated Sep. 23, 2015 for U.S. Appl. No. 13/931,904.
Notice of Allowance dated Nov. 5, 2015 for U.S. Appl. No. 13/931,914.
Office Action dated Aug. 26, 2015 for U.S. Appl. No. 13/931,906.
Office Action dated Aug. 17, 2015 for U.S. Appl. No. 13/931,907.
Office Action dated Aug. 26, 2015 for U.S. Appl. No. 13/931,908.
Office Action dated Sep. 25, 2015 for U.S. Appl. No. 13/931,910.
Office Action dated Nov. 19, 2015 for U.S. Appl. No. 13/931,911.
Office Action dated Aug. 14, 2015 for U.S. Appl. No. 13/931,913.

* cited by examiner

FULL BANDWIDTH PACKET HANDLING WITH SERVER SYSTEMS INCLUDING OFFLOAD PROCESSORS

PRIORITY CLAIMS

This application claims the benefit of U.S. Provisional Patent Applications 61/753,892 filed on Jan. 17, 2013, 61/753,895 filed on Jan. 17, 2013, 61/753,899 filed on Jan. 17, 2013, 61/753,901 filed on Jan. 17, 2013, 61/753,903 filed on Jan. 17, 2013, 61/753,904 filed on Jan. 17, 61/753, 906 filed on Jan. 17, 2013, 61/753,907 filed on Jan. 17, 2013, and 61/753,910 filed on Jan. 17, 2013, the contents all of which are incorporated by reference herein.

TECHNICAL FIELD

Described embodiments relate to rack level or cluster level server systems with network packet processing provided in part by a memory bus connected module with offload processors.

BACKGROUND

Efficient managing of network packet flow and processing is critical for high performance networked computing systems. Network packet flow is highly variable, depending on hardware configurations, process flows and data flows, with data processing needs varying over several orders of magnitude on time scales that can range from seconds to hours. Substantial improvements in network service would be made possible by systems that can flexibly process a data flow, recognize or characterize patterns in the data flow, and improve routing and processing decisions for the data flow.

Unfortunately, the tree-like server connection topology often used in conventional data centers can be prone to traffic slowdowns and computational bottlenecks. Typically, all the servers in such data centers communicate with each other through higher level Ethernet-type switches, such as Top-Of-Rack (TOR) switches. Flow of all the traffic through such TOR switches leads to congestion resulting in increased network latency, particularly during the periods of high usage. Further, these switches are expensive and often need replacement to accommodate upgrades to higher network speeds.

SUMMARY

This disclosure describes embodiments of systems, hardware and methods suitable to create a rack server system for a packet processing. The rack server system has multiple servers with a top of rack (TOR) unit connectable to each of the servers. Multiple offload processor modules are provided, with each offload processor module having an input-output (10) port and multiple offload processors. One offload processor module can be directly connected to another offload processor module through respective IO ports. In certain embodiments, offload processors can be connected to the servers through a memory bus, and can further be mounted in a dual in line memory module (DIMM) or other memory socket.

Typically, one or more offload processor modules are connected to each server on the rack. In operation, a midplane switch can be defined for forwarding network packets to one or more of the multiple offload processor modules based on availability of the offload processors. In certain systems, the offload processor modules can be configured to receive network packets from the server through a memory bus or from the (IO) port on the offload processor module.

In another embodiment, an inter-rack server system for a packet processing can include multiple servers arranged into multiple racks. Multiple TOR units can be connected to each of the multiple servers, with each TOR unit further acting as a TOR switch connecting each of the multiple racks to another of the multiple racks. In this configuration, each offload processor module has an IO port and multiple offload processors, and one offload processor module on a first server on a first rack can be connected directly to another offload processor module on a second server on a second rack, with connection provided through respective IO ports.

Another embodiment provides a distributed system server system for a packet processing without top of rack (TOR) units. Multiple servers, each having one or more host processors can support multiple offload processor modules. Each offload processor module has an IO port and multiple offload processors. One offload processor module can be connected directly to another offload processor module through respective IO ports to provide bidirectional network packet flow to both the multiple offload processors and the one or more server host processors. This can form an inter-server connection without TOR units.

Another embodiment includes a rack server system for a map/reduce data processing. Multiple servers arranged in a rack can support multiple offload processor modules. Each offload processor module has an IO port and multiple offload processors, and one first offload processor module can be connected directly to another offload processor module through respective IO ports to define a midplane switch, with results from map steps performed by one offload processor module forwarded through the midplane switch to the other offload processor module to perform reduce steps.

Another embodiment includes a distributed system server system for providing network overlay services. At least two servers can respectively support at least one offload processor module capable of receiving and processing network packets with a logical identifier. Each offload processor module has an IO port and multiple offload processors, and a one offload processor module can be connected directly to another offload processor module through respective IO ports to provide bidirectional network packet flow to both of the multiple offload processors modules for processing of packets having logical identifiers. Processed packets from the offload processors are returned to the network through the IO port on the offload processor module.

BRIEF DESCRIPTION OF THE DRAWINGS

FIG. 1-1 shows multiple racks connected to each other according to an embodiment.

FIG. 1-2 shows a highly interconnected network architecture not requiring top of rack (TOR) switches, according to an embodiment.

FIGS. 2-0 to 2-3 show server attached offload processor modules capable of being supported by rack servers according to various embodiments.

FIG. 2-4 shows a conventional dual-in-line memory module.

FIG. 2-5 shows a system according to another embodiment.

FIG. 3 shows one particular implementation of a system having a memory bus connected offload processor capable of supporting dataflow scheduling according to an embodiment.

FIG. 4 shows an exemplary flow chart for a map/reduce data processing using at least one server rack according to an embodiment.

FIGS. 5 and 6 respectively show a system and an exemplary flow chart for network packet processing across multiple servers according to embodiments.

DETAILED DESCRIPTION

Various embodiments of the present invention will now be described in detail with reference to a number of drawings. The embodiments show clusters or racks of servers, with some servers able to support processor modules, systems, and methods having offload modules connected to a system memory bus. Such modules can include offload processors that are in addition to any host processors connected to the system memory bus, and that can operate on data transferred over the system memory bus, independent of any host processors. In very particular embodiments, offload processor modules can populate physical sockets or slots for connecting in-line memory modules (e.g., dual in line memory modules (DIMMs)) to a system memory bus. It will be understood that offload processor modules can reside on individual rack server units or blades that in turn reside on racks or individual servers. These can be further grouped into clusters and datacenters, which can be spatially located in the same building, in the same city, or even in different countries. Any grouping level can be connected to each other, and/or connected to public or private cloud internets.

Figures 0, 1:
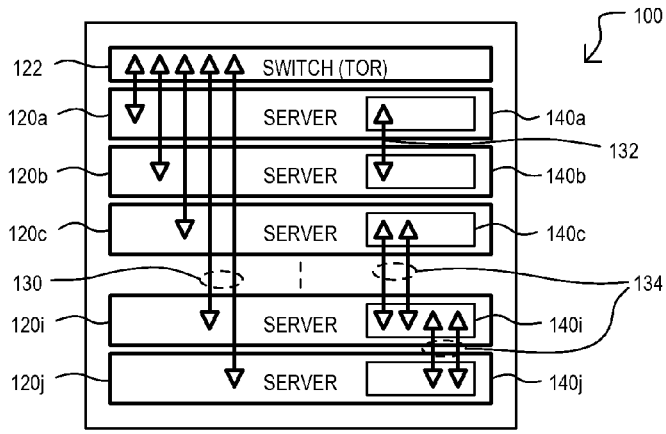
FIG. 1-0 shows a rack server system according to an embodiment.
Figure 1:
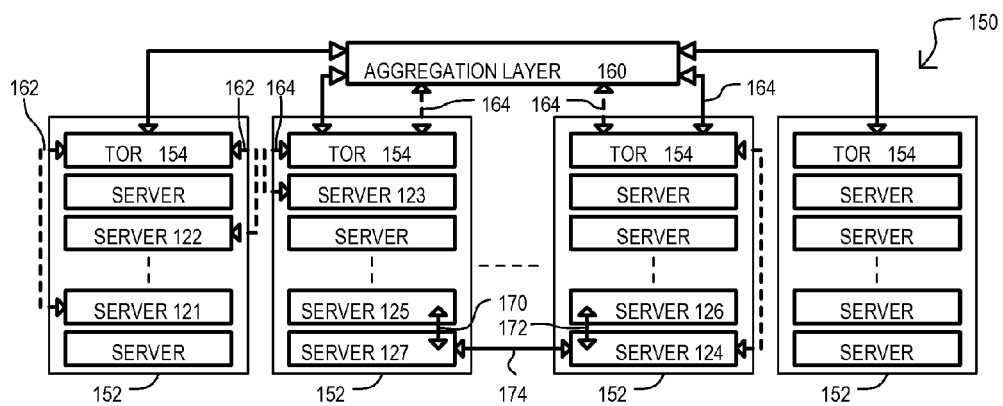

FIG. 1-0 is a diagram of a system 100 according to an embodiment. A system can include servers (120a to 120j) and a top of rack (TOR) switch 122. While servers can take various forms, in a particular embodiment, servers (120a, 120b, 120c, 120i, and 120j) can be rack mounted server (i.e., rack server). Each server (120a to 120j) can have multiple input/output (I/O) ports, which can support connections based on Ethernet (or related), Infiniband, Fibre Channel, or other available data and signal transport technologies. Each server (120a to 120j) can be connected to TOR switch 122, which can interfaces with all the servers (120a to 120j) using connections 130. In particular embodiments, system 100 can represent multiple units mounted in a same rack.

According to embodiments, additional connections are also enabled between individual servers by operation of offload processor modules (140a, 140b, 140c, 140i, 140j). In the particular embodiment shown, offload processors can provide connections between two servers (e.g., 132 between 120a and 120b) or groups of servers (connections 134 between 120c, 120i, and 120j) to permit direct data transfer between servers using offload processor modules 140a, 140b, 140c, 140i, 140j. Connections between offload processor modules (140a, 140b, 140c, 140i, 140j) can be via IO ports for such offload processors. Accordingly, while this embodiment includes a TOR switch 122 for server to server, or server to multiple server data transfers, alternate embodiments can have no TOR switch 122, as connections 132 or 134 are available.

In certain embodiments, in addition to IO ports, the offload processor modules 140a, 140b, 140c, 140i, 140j can include a physical in-line module connector, a memory interface to the server, multiple offload processors, local memory, and control logic for directing data, including network packets, to memory, server, or offload processors. In particular embodiments, a module connector can be compatible with a dual in-line memory module (DIMM) slot of a computing system. Since each server typically contains multiple DIMM slots, a mix of offload processor modules and DIMM memory can be supported.

FIG. 1-1 shows a system 150 according to an embodiment. A system 150 can include multiple racks 152 connected through their respective TOR switches 154. TOR switches 154 can communicate with each other through an aggregation layer 160. Aggregation layer 160 may include several switches and routers and can act as the interface between an external network and the server racks 152. In this tree-like topology, data frame communication between various server units can be routed through the corresponding TOR switches 154. For example, if a server unit 121 needs to forward a packet to server unit 122 (intra-rack communication), it may do so via path 162 (dashed line). Communication between server units 123 and 124 (inter-rack communication) may happen via path 164 (dotted line).

According to embodiments, to prevent data transfer bottlenecks through TOR switches, and/or to improvement system performance, direct inter-rack and/or intra-rack communication can be enabled by offload processor modules included in the servers. For example, direct intra-rack server communication 170 and 172 can be enabled by offload processor modules within servers 125/127 and 124/126, respectively. Inter-rack server communication 174 can be enabled by offload processor modules in servers 124/127. Such offload processor modules can take the form of any of those described herein, or equivalents. As will be appreciated, such data communication via offload processor modules can require less time and/or less processing power as compared to TOR switching via aggregation layer transfers. Accordingly, such data transfers can be executed in a more efficient manner than conventional systems.

Advantageously, inter/intra-rack communications via offload server modules can also reduce the need for additional TOR switches and can be included to increase bandwidth and introduce redundancy, particularly since TOR switches may have to be periodically replaced to handle higher network speeds.

Figures 1, 2:
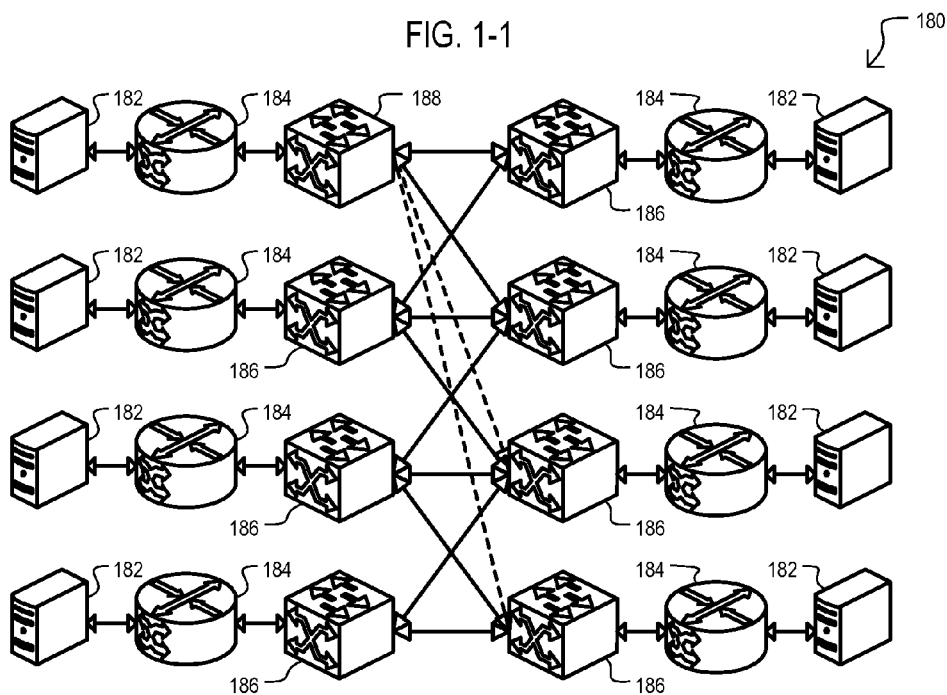

FIG. 1-2 shows another system 180 according to an embodiment. A system 180 can be a network server architecture that does not include TOR switches for inter-rack or intra-rack communication. FIG. 1-2 shows a system 180 with a midplane switch architecture. One or more server units 182 can support offload processor modules 184 which can act as virtual switches 186 that are capable of receiving and forwarding network packets. Virtual switches 186 can have connections to one another, and in particular embodiments, all the virtual switches 186 can be connected to one other. Offload processor modules 184 can take the form of any of those shown herein, or equivalents. In particular embodiments, offload processor modules 184 are mountable in DIMM sockets of a server unit). Ingress packets can be examined and classified by the offload processor modules 184. Such examination can include deep packet inspection and classification with a high degree of granularity. This is in contrast to TOR switches in conventional tree-like topologies, which forward packets based only on a media access control (MAC) address.

According to some embodiments, a system 180 can include TOR switches, but operation of such switches can be limited to forwarding packets to offload processor modules 184 such that most or all of any packet processing can be handled by the offload processor modules 184. In such cases, it can be possible to scale up packet handling capabilities by equipping more server units with offload processor modules 184 (or increasing the number of offload processor modules per server), as needed. This is in contrast to conventional approaches, which may upgrade TOR switches, which can be costly.

According to some embodiments, one or more of the offload processor modules can be configured to act as a traffic manager for the midplane switch. A traffic manager processor module 188 can monitor the traffic and provide multiple communication paths between servers units 182. Such an arrangement may have better fault tolerance compared to tree-like network topologies.

In certain embodiments, one or more offload processor modules can be configured as layer 3 routers that can route traffic into and out of the server racks. These offload processor modules 184 can bridge all the interconnected servers to an external (10 GB or faster) Ethernet-type connection.

In some embodiments, inclusion of offload processor modules can enable TOR switches to be omitted from a system 180, with overall network data transfer and processing speeds being improved over conventional architectures.

As will be understood, many of the processing tasks for execution by an offload processor or server host processor can be implemented on multiple threads running on multiple processing cores, with multiple processors in each server being supported. Such parallelization of tasks into multiple thread contexts can provide for increased throughput. Processors architectures such as MIPS may include deep instruction pipelines to improve the number of instructions per cycle. Further, the ability to run a multi-threaded programming environment results in enhanced usage of existing processor resources. To further increase parallel execution on the hardware, processor architecture may include multiple processor cores. Multi-core architectures including the same type of cores, referred to as homogeneous core architectures, can provide higher instruction throughput by parallelizing threads or processes across multiple cores. However, in such homogeneous core architectures, the shared resources, such as memory, are amortized over a small number of processors. In still other embodiments, multiple offload or host processors can reside on modules connected to individual rack units or blades that in turn reside on racks or individual servers. These can be further grouped into clusters and datacenters, which can be spatially located in the same building, in the same city, or even in different countries. Any grouping level can be connected to each other, and/or connected to public or private cloud internets.

Memory and I/O accesses can incur a high amount of processor overhead. Further, context switches in conventional general purpose processing units can be computationally intensive. It is therefore desirable to reduce context switch overhead in a networked computing resource handling a plurality of networked applications in order to increase processor throughput. Conventional server loads can require complex transport, high memory bandwidth, extreme amounts of data bandwidth (randomly accessed, parallelized, and highly available), but often with light touch processing: HTML, video, packet-level services, security, and analytics. Further, idle processors still consume more than 50% of their peak power consumption.

In contrast, according to embodiments herein, complex transport, data bandwidth intensive, frequent random access oriented, "light touch" processing loads can be handled behind a socket abstraction created on multiple offload processor cores. At the same time, "heavy touch", computing intensive loads can be handled by a socket abstraction on a host processor core (e.g., x86 processor cores). Such software sockets can allow for a natural partitioning of these loads between offload processor (e.g., ARM) cores and host processor (e.g., x86) cores. By usage of new application level sockets, according to embodiments, server loads can be broken up across the offload processing cores and the host processing cores.

FIGS. 2-0 to 2-5 describe aspects of hardware and method embodiments that can provide communication interconnections between servers using memory bus mounted offload processor modules. Such communications can be inter-rack and/or intra-rack communications. In particular embodiments, offload processor modules can be DIMM mounted modules.

FIGS. 2-0 to 2-5 describe aspects of hardware embodiments of a module that can include context switching as described herein. In particular embodiments, such processing modules can include DIMM mountable modules.

FIG. 2-0 is a block diagram of a processing module 200 according to one embodiment. A processing module 200 can include a physical connector 202, a memory interface 204, arbiter logic 206, offload processor(s) 208, local memory 210, and control logic 212. A connector 202 can provide a physical connection to system memory bus. This is in contrast to a host processor which can access a system memory bus via a memory controller, or the like. In very particular embodiments, a connector 202 can be compatible with a dual in-line memory module (DIMM) slot of a computing system. Accordingly, a system including multiple DIMM slots can be populated with one or more processing modules 200, or a mix of processing modules and DIMM modules.

A memory interface 204 can detect data transfers on a system memory bus, and in appropriate cases, enable write data to be stored in the processing module 200 and/or read data to be read out from the processing module 200. Such data transfers can include the receipt of packet data having a particular network identifier. In some embodiments, a memory interface 204 can be a slave interface, thus data transfers are controlled by a master device separate from the processing module 200. In very particular embodiments, a memory interface 204 can be a direct memory access (DMA) slave, to accommodate DMA transfers over a system memory bus initiated by a DMA master. In some embodiments, a DMA master can be a device different from a host processor. In such configurations, processing module 200 can receive data for processing (e.g., DMA write), and transfer processed data out (e.g., DMA read) without consuming host processor resources.

Arbiter logic 206 can arbitrate between conflicting accesses of data within processing module 200. In some embodiments, arbiter logic 206 can arbitrate between accesses by offload processor 208 and accesses external to the processor module 200. It is understood that a processing module 200 can include multiple locations that are operated on at the same time. It is understood that accesses arbitrated by arbiter logic 206 can include accesses to physical system memory space occupied by the processor module 200, as well as accesses to other resources (e.g., cache memory of offload or host processor). Accordingly, arbitration rules for arbiter logic 206 can vary according to application. In some embodiments, such arbitration rules are fixed for a given processor module 200. In such cases, different applications can be accommodated by switching out different processing modules. However, in alternate embodiments, such arbitration rules can be configurable.

Offload processor 208 can include one or more processors that can operate on data transferred over the system memory bus. In some embodiments, offload processors can run a general operating system or server applications such as Apache (as but one very particular example), enabling processor contexts to be saved and retrieved. Computing tasks executed by offload processor 208 can be handled by the hardware scheduler. Offload processors 208 can operate on data buffered in the processor module 200. In addition or alternatively, offload processors 208 can access data stored elsewhere in a system memory space. In some embodiments, offload processors 208 can include a cache memory configured to store context information. An offload processor 208 can include multiple cores or one core.

A processor module 200 can be included in a system having a host processor (not shown). In some embodiments, offload processors 208 can be a different type of processor as compared to the host processor. In particular embodiments, offload processors 208 can consume less power and/or have less computing power than a host processor. In very particular embodiments, offload processors 208 can be "wimpy" core processors, while a host processor can be a "brawny" core processor. However, in alternate embodiments, offload processors 208 can have equivalent computing power to any host processor. In very particular embodiments, a host processor can be an x86 type processor, while an offload processor 208 can include an ARM, ARC, Tensilica, MIPS, Strong/ARM, or RISC type processor, as but a few examples.

Local memory 210 can be connected to offload processor 208 to enable the storing of context information. Accordingly, an offload processor 208 can store current context information, and then switch to a new computing task, then subsequently retrieve the context information to resume the prior task. In very particular embodiments, local memory 210 can be a low latency memory with respect to other memories in a system. In some embodiments, storing of context information can include copying an offload processor 208 cache.

In some embodiments, a same space within local memory 210 is accessible by multiple offload processors 208 of the same type. In this way, a context stored by one offload processor can be resumed by a different offload processor.

Control logic 212 can control processing tasks executed by offload processor(s). In some embodiments, control logic 212 can be considered a hardware scheduler that can be conceptualized as including a data evaluator 214, scheduler 216 and a switch controller 218. A data evaluator 214 can extract "metadata" from write data transferred over a system memory bus. "Metadata", as used herein, can be any information embedded at one or more predetermined locations of a block of write data that indicates processing to be performed on all or a portion of the block of write data and/or indicate a particular task/process to which the data belongs (e.g., classification data). In some embodiments, metadata can be data that indicates a higher level organization for the block of write data. As but one very particular embodiment, metadata can be header information of one or more network packets (which may or may not be encapsulated within a higher layer packet structure).

A scheduler 216 (e.g., a hardware scheduler) can order computing tasks for offload processor(s) 208. In some embodiments, scheduler 216 can generate a schedule that is continually updated as write data for processing is received. In very particular embodiments, a scheduler 216 can generate such a schedule based on the ability to switch contexts of offload processor(s) 208. In this way, on-module computing priorities can be adjusted on the fly. In very particular embodiments, a scheduler 216 can assign a portion of physical address space (e.g., memory locations within local memory 210) to an offload processor 208, according to computing tasks. The offload processor 208 can then switch between such different spaces, saving context information prior to each switch, and subsequently restoring context information when returning to the memory space.

Switch controller 218 can control computing operations of offload processor(s) 208. In particular embodiments, according to scheduler 216, switch controller 218 can order offload processor(s) 208 to switch contexts. It is understood that a context switch operation can be an "atomic" operation, executed in response to a single command from switch controller 218. In addition or alternatively, a switch controller 218 can issue an instruction set that stores current context information, recalls context information, etc.

In some embodiments, processor module 200 can include a buffer memory (not shown). A buffer memory can store received write data on board the processor module. A buffer memory can be implemented on an entirely different set of memory devices, or can be a memory embedded with logic and/or the offload processor. In the latter case, arbiter logic 206 can arbitrate access to the buffer memory. In some embodiments, a buffer memory can correspond to a portion of a system physical memory space. The remaining portion of the system memory space can correspond to other like processor modules and/or memory modules connected to the same system memory bus. In some embodiments buffer memory can be different than local memory 210. For example, buffer memory can have a slower access time than local memory 210. However, in other embodiments, buffer memory and local memory can be implemented with like memory devices.

In very particular embodiments, write data for processing can have an expected maximum flow rate. A processor module 200 can be configured to operate on such data at, or faster than, such a flow rate. In this way, a master device (not shown) can write data to a processor module without danger of overwriting data "in process".

The various computing elements of a processor module 200 can be implemented as one or more integrated circuit devices (ICs). It is understood that the various components shown in FIG. 2-0 can be formed in the same or different ICs. For example, control logic 212, memory interface 214, and/or arbiter logic 206 can be implemented on one or more logic ICs, while offload processor(s) 208 and local memory 210 are separate ICs. Logic ICs can be fixed logic (e.g., application specific ICs), programmable logic (e.g., field programmable gate arrays, FPGAs), or combinations thereof.

Advantageously, the foregoing hardware and systems can provide improved computational performance as compared to traditional computing systems. Conventional systems, including those based on x86 processors, are often ill-equipped to handle such high volume applications. Even idling, x86 processors use a significant amount of power, and near continuous operation for high bandwidth packet analysis or other high volume processing tasks makes the processor energy costs one of the dominant price factors.

In addition, conventional systems can have issues with the high cost of context switching wherein a host processor is required to execute instructions which can include switching from one thread to another. Such a switch can require storing and recalling the context for the thread. If such context data is resident in a host cache memory, such a context switch can occur relatively quickly. However, if such context data is no longer in cache memory (i.e., a cache miss), the data must be recalled from system memory, which can incur a multicycle latency. Continuous cache misses during context switching can adversely impact system performance.

FIG. 2-1 shows a processor module 200-1 according to one very particular embodiment which is capable of reducing issues associated with high volume processing or context switching associated with many conventional server systems. A processor module 200-1 can include ICs 220-0/1 mounted to a printed circuit board (PCB) type substrate 222. PCB type substrate 222 can include in-line module connector 202, which in one very particular embodiment, can be a DIMM compatible connector. IC 220-0 can be a system-on-chip (SoC) type device, integrating multiple functions. In the very particular embodiment shown, an IC 220-0 can include embedded processor(s), logic and memory. Such embedded processor(s) can be offload processor(s) 208 as described herein, or equivalents. Such logic can be any of controller logic 212, memory interface 204 and/or arbiter logic 206, as described herein, or equivalents. Such memory can be any of local memory 210, cache memory for offload processor(s) 208, or buffer memory, as described herein, or equivalents. Logic IC 220-1 can provide logic functions not included IC 220-0.

FIG. 2-2 shows a processor module 200-2 according to another very particular embodiment. A processor module 200-2 can include ICs 220-2, -3, -4, -5 mounted to a PCB type substrate 222, like that of FIG. 2-1. However, unlike FIG. 2-1, processor module functions are distributed among single purpose type ICs. IC 220-2 can be a processor IC, which can be an offload processor 208. IC 220-3 can be a memory IC which can include local memory 210, buffer memory, or combinations thereof. IC 220-4 can be a logic IC which can include control logic 212, and in one very particular embodiment, can be an FPGA. IC 220-5 can be another logic IC which can include memory interface 204 and arbiter logic 206, and in one very particular embodiment, can also be an FPGA.

It is understood that FIGS. 2-1/2 represent but two of various implementations. The various functions of a processor module can be distributed over any suitable number of ICs, including a single SoC type IC.

Figures 0, 2:
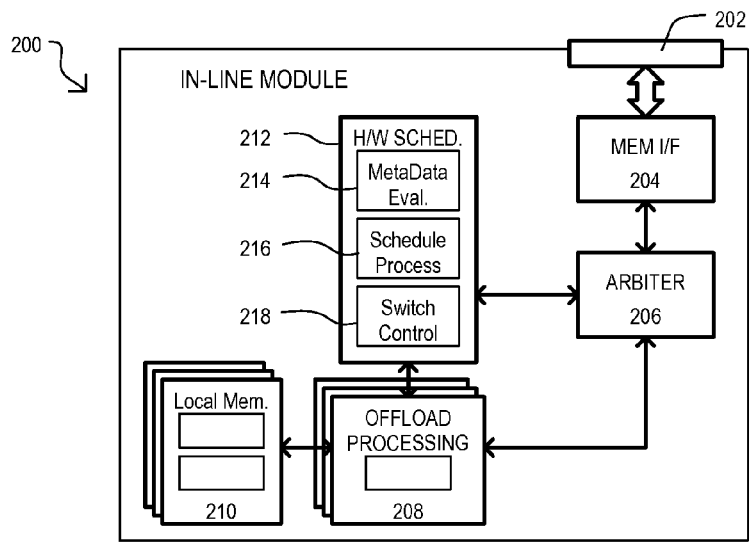
Figures 1, 2:
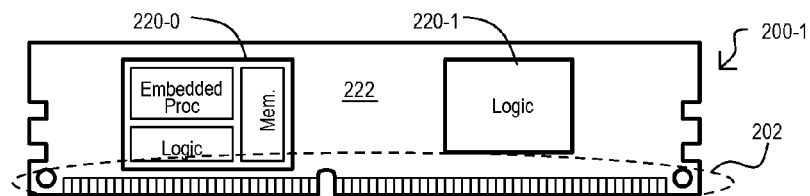
Figure 2:
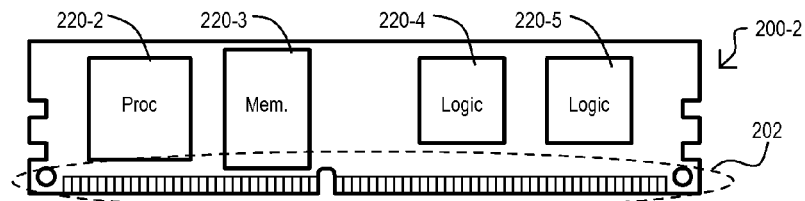
Figures 2, 3:
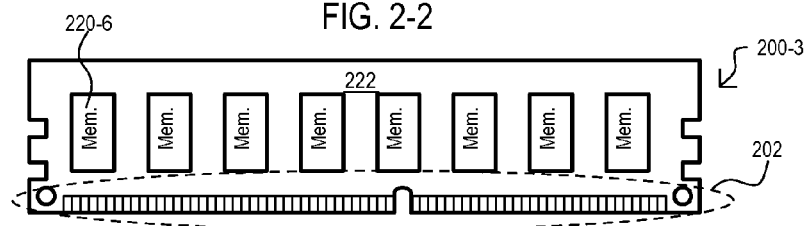

FIG. 2-3 shows an opposing side of a processor module 200-1 or 200-2 according to a very particular embodiment. Processor module 200-3 can include a number of memory ICs, one shown as 220-6, mounted to a PCB type substrate 222, like that of FIG. 2-1. It is understood that various processing and logic components can be mounted on an opposing side to that shown. A memory IC 220-6 can be configured to represent a portion of the physical memory space of a system. Memory ICs 220-6 can perform any or all of the following functions: operate independently of other processor module components, providing system memory accessed in a conventional fashion; serve as buffer memory, storing write data that can be processed with other processor module components, or serve as local memory for storing processor context information.

Figures 2, 3, 4:
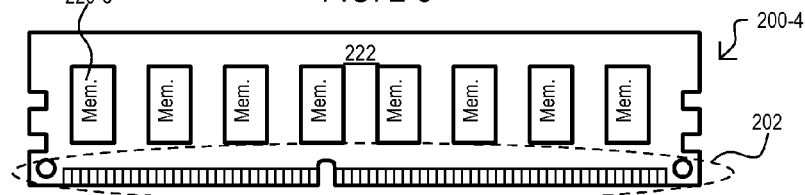

FIG. 2-4 shows a conventional DIMM module (i.e., it serves only a memory function) that can populate a memory bus along with processor modules as described herein, or equivalents.

FIG. 2-5 shows a system 230 according to one embodiment. A system 230 can include a system memory bus 228 accessible via a multiple in-line module slots (one shown as 226). According to embodiments, any or all of the slots 226 can be occupied by a processor module 200 as described herein, or an equivalent. In the event all slots 226 are not occupied by a processor module 200, available slots can be occupied by conventional in-line memory modules 224. In a very particular embodiment, slots 226 can be DIMM slots.

In some embodiments, a processor module 200 can occupy one slot. However, in other embodiments, a processor module can occupy multiple slots.

In some embodiments, a system memory bus 228 can be further interfaced with one or more host processors and/or input/output device (not shown).

Having described processor modules according to various embodiments, operations of an offload processor module capable of interfacing with server or similar system via a memory bus and according to a particular embodiment will now be described.

FIG. 3 shows a system 301 that can execute context switches in offload processors according to an embodiment. In the example shown, a system 301 can transport packet data to one or more computational units (one shown as 300) located on a module, which in particular embodiments, can include a connector compatible with an existing memory module. In some embodiments, a computational unit 300 can include a processor module as described in embodiments herein, or an equivalent. A computational unit 300 can be capable of intercepting or otherwise accessing packets sent over a memory bus 316 and carrying out processing on such packets, including but not limited to termination or metadata processing. A system memory bus 316 can be a system memory bus like those described herein, or equivalents (e.g., 228).

Referring still to FIG. 3, a system 301 can include an I/O device 302 which can receive packet or other I/O data from an external source. In some embodiments I/O device 302 can include physical or virtual functions generated by the physical device to receive a packet or other I/O data from the network or another computer or virtual machine. In the very particular embodiment shown, an I/O device 302 can include a network interface card (NIC) having input buffer 302a (e.g., DMA ring buffer) and an I/O virtualization function 302b.

According to embodiments, an I/O device 302 can write a descriptor including details of the necessary memory operation for the packet (i.e. read/write, source/destination). Such a descriptor can be assigned a virtual memory location (e.g., by an operating system of the system 301). I/O device 302 then communicates with an input output memory management unit (IOMMU) 304 which can translate virtual addresses to corresponding physical addresses with an IOMMU function 304b. In the particular embodiment shown, a translation look-aside buffer (TLB) 304a can be used for such translation. Virtual function reads or writes data between I/O device and system memory locations can then be executed with a direct memory transfer (e.g., DMA) via a memory controller 306b of the system 301. An I/O device 302 can be connected to IOMMU 304 by a host bus 312. In one very particular embodiment, a host bus 312 can be a peripheral interconnect (PCI) type bus. IOMMU 304 can be connected to a host processing section 306 at a central processing unit I/O (CPUIO) 306a. In the embodiment shown, such a connection 314 can support a HyperTransport (HT) protocol.

In the embodiment shown, a host processing section 306 can include the CPUIO 306a, memory controller 306b, processing core 306c and corresponding provisioning agent 306d.

In particular embodiments, a computational unit 300 can interface with the system bus 316 via standard in-line module connection, which in very particular embodiments can include a DIMM type slot. In the embodiment shown, a memory bus 316 can be a DDR3 type memory bus. Alternate embodiments can include any suitable system memory bus. Packet data can be sent by memory controller 306b via memory bus 316 to a DMA slave interface 310a. DMA slave interface 310a can be adapted to receive encapsulated read/write instructions from a DMA write over the memory bus 316.

A hardware scheduler (308b/c/d/e/h) can perform traffic management on incoming packets by categorizing them according to flow using session metadata. Packets can be queued for output in an onboard memory (310b/308a/308m) based on session priority. When the hardware scheduler determines that a packet for a particular session is ready to be processed by the offload processor 308i, the onboard memory is signaled for a context switch to that session. Utilizing this method of prioritization, context switching overhead can be reduced, as compared to conventional approaches. That is, a hardware scheduler can handle context switching decisions and thus optimize the performance of the downstream resource (e.g., offload processor 308i).

As noted above, in very particular embodiments, an offload processor 308i can be a "wimpy core" type processor. According to some embodiments, a host processor 306c can be a "brawny core" type processor (e.g., an x86 or any other processor capable of handling "heavy touch" computational operations). While an I/O device 302 can be configured to trigger host processor interrupts in response to incoming packets, according to embodiments, such interrupts can be disabled, thereby reducing processing overhead for the host processor 306c. In some very particular embodiments, an offload processor 308i can include an ARM, ARC, Tensilica, MIPS, Strong/ARM or any other processor capable of handling "light touch" operations. Preferably, an offload processor can run a general purpose operating system for executing a plurality of sessions, which can be optimized to work in conjunction with the hardware scheduler in order to reduce context switching overhead.

Referring still to FIG. 3, in operation, a system 301 can receive packets from an external network over a network interface. The packets are destined for either a host processor 306c or an offload processor 308i based on the classification logic and schematics employed by I/O device 302. In particular embodiments, I/O device 302 can operate as a virtualized NIC, with packets for a particular logical network or to a certain virtual MAC (VMAC) address can be directed into separate queues and sent over to the destination logical entity. Such an arrangement can transfer packets to different entities. In some embodiments, each such entity can have a virtual driver, a virtual device model that it uses to communicate with connected virtual network.

According to embodiments, multiple devices can be used to redirect traffic to specific memory addresses. So, each of the network devices operates as if it is transferring the packets to the memory location of a logical entity. However, in reality, such packets are transferred to memory addresses where they can be handled by one or more offload processors (e.g., 308i). In particular embodiments such transfers are to physical memory addresses, thus logical entities can be removed from the processing, and a host processor can be free from such packet handling.

Accordingly, embodiments can be conceptualized as providing a memory "black box" to which specific network data can be fed. Such a memory black box can handle the data (e.g., process it) and respond back when such data is requested.

Referring still to FIG. 3, according to some embodiments, I/O device 302 can receive data packets from a network or from a computing device. The data packets can have certain characteristics, including transport protocol number, source and destination port numbers, source and destination IP addresses, for example. The data packets can further have metadata that is processed (308d) that helps in their classification and management.

I/O device 302 can include, but is not limited to, peripheral component interconnect (PCI) and/or PCI express (PCIe) devices connecting with a host motherboard via PCI or PCIe bus (e.g., 312). Examples of I/O devices include a network interface controller (NIC), a host bus adapter, a converged network adapter, an ATM network interface, etc.

In order to provide for an abstraction scheme that allows multiple logical entities to access the same I/O device 302, the I/O device may be virtualized to provide for multiple virtual devices each of which can perform some of the functions of the physical I/O device. The 10 virtualization program (e.g., 302b) according to an embodiment, can redirect traffic to different memory locations (and thus to different offload processors attached to modules on a memory bus). To achieve this, an I/O device 302 (e.g., a network card) may be partitioned into several function parts; including controlling function (CF) supporting input/output virtualization (IOV) architecture (e.g., single-root IOV) and multiple virtual function (VF) interfaces. Each virtual function interface may be provided with resources during runtime for dedicated usage. Examples of the CF and VF may include the physical function and virtual functions under schemes such as Single Root I/O Virtualization or Multi-Root I/O Virtualization architecture. The CF acts as the physical resources that sets up and manages virtual resources. The CF is also capable of acting as a full-fledged 10 device. The VF is responsible for providing an abstraction of a virtual device for communication with multiple logical entities/multiple memory regions.

The operating system/the hypervisor/any of the virtual machines/user code running on a host processor 306c may be loaded with a device model, a VF driver and a driver for a CF. The device model may be used to create an emulation of a physical device for the host processor 306c to recognize each of the multiple VFs that are created. The device model may be replicated multiple times to give the impression to a VF driver (a driver that interacts with a virtual IO device) that it is interacting with a physical device of a particular type.

For example, a certain device module may be used to emulate a network adapter such as the Intel® Ethernet Converged Network Adapter(CNA) X540-T2, so that the I/O device 302 believes it is interacting with such an adapter. In such a case, each of the virtual functions may have the capability to support the functions of the above said CNA, i.e., each of the Physical Functions should be able to support such functionality. The device model and the VF driver can be run in either privileged or non-privileged mode. In some embodiments, there is no restriction with regard to who hosts/runs the code corresponding to the device model and the VF driver. The code, however, has the capability to create multiple copies of device model and VF driver so as to enable multiple copies of said I/O interface to be created.

An application or provisioning agent 306d, as part of an application/user level code running in a kernel, may create a virtual I/O address space for each VF, during runtime and allocate part of the physical address space to it. For example, if an application handling the VF driver instructs it to read or write packets from or to memory addresses 0xaaaa to 0xffff, the device driver may write I/O descriptors into a descriptor queue with a head and tail pointer that are changed dynamically as queue entries are filled. The data structure may be of another type as well, including but not limited to a ring structure 302a or hash table.

The VF can read from or write data to the address location pointed to by the driver. Further, on completing the transfer of data to the address space allocated to the driver, interrupts, which are usually triggered to the host processor to handle said network packets, can be disabled. Allocating a specific I/O space to a device can include allocating said IO space a specific physical memory space occupied.

In another embodiment, the descriptor may comprise only a write operation, if the descriptor is associated with a specific data structure for handling incoming packets. Further, the descriptor for each of the entries in the incoming data structure may be constant so as to redirect all data write to a specific memory location. In an alternate embodiment, the descriptor for consecutive entries may point to consecutive entries in memory so as to direct incoming packets to consecutive memory locations.

Alternatively, said operating system may create a defined physical address space for an application supporting the VF drivers and allocate a virtual memory address space to the application or provisioning agent 306d, thereby creating a mapping for each virtual function between said virtual address and a physical address space. Said mapping between virtual memory address space and physical memory space may be stored in IOMMU tables (e.g., a TLB 304a). The application performing memory reads or writes may supply virtual addresses to say virtual function, and the host processor OS may allocate a specific part of the physical memory location to such an application.

Alternatively, VF may be configured to generate requests such as read and write which may be part of a direct memory access (DMA) read or write operation, for example. The virtual addresses is be translated by the IOMMU 304 to their corresponding physical addresses and the physical addresses may be provided to the memory controller for access. That is, the IOMMU 304 may modify the memory requests sourced by the I/O devices to change the virtual address in the request to a physical address, and the memory request may be forwarded to the memory controller for memory access. The memory request may be forwarded over a bus 314 that supports a protocol such as HyperTransport 314. The VF may in such cases carry out a direct memory access by supplying the virtual memory address to the IOMMU 304.

Alternatively, said application may directly code the physical address into the VF descriptors if the VF allows for it. If the VF cannot support physical addresses of the form used by the host processor 306c, an aperture with a hardware size supported by the VF device may be coded into the descriptor so that the VF is informed of the target hardware address of the device. Data that is transferred to an aperture may be mapped by a translation table to a defined physical address space in the system memory. The DMA operations may be initiated by software executed by the processors, programming the I/O devices directly or indirectly to perform the DMA operations.

Referring still to FIG. 3, in particular embodiments, parts of computational unit 300 can be implemented with one or more FPGAs. In the system of FIG. 3, computational unit 300 can include FPGA 310 in which can be formed a DMA slave device module 310a and arbiter 310f. A DMA slave module 310a can be any device suitable for attachment to a memory bus 316 that can respond to DMA read/write requests. In alternate embodiments, a DMA slave module 310a can be another interface capable of block data transfers over memory bus 316. The DMA slave module 310a can be capable of receiving data from a DMA controller (when it performs a read from a 'memory' or from a peripheral) or transferring data to a DMA controller (when it performs a write instruction on the DMA slave module 310a). The DMA slave module 310a may be adapted to receive DMA read and write instructions encapsulated over a memory bus, (e.g., in the form of a DDR data transmission, such as a packet or data burst), or any other format that can be sent over the corresponding memory bus.

A DMA slave module 310a can reconstruct the DMA read/write instruction from the memory R/W packet. The DMA slave module 310a may be adapted to respond to these instructions in the form of data reads/data writes to the DMA master, which could either be housed in a peripheral device, in the case of a PCIe bus, or a system DMA controller in the case of an ISA bus.

I/O data that is received by the DMA device 310a can then queued for arbitration. Arbitration can include the process of scheduling packets of different flows, such that they are provided access to available bandwidth based on a number of parameters. In general, an arbiter 310f provides resource access to one or more requestors. If multiple requestors request access, an arbiter 310f can determine which requestor becomes the accessor and then passes data from the accessor to the resource interface, and the downstream resource can begin execution on the data. After the data has been completely transferred to a resource, and the resource has competed execution, the arbiter 310f can transfer control to a different requestor and this cycle repeats for all available requestors. In the embodiment of FIG. 3 arbiter 310f can notify other portions of computational unit 300 (e.g., 308) of incoming data.

Alternatively, a computation unit 300 can utilize an arbitration scheme shown in U.S. Pat. No. 7,813,283, issued to Dalal on Oct. 12, 2010, the contents of which are incorporated herein by reference. Other suitable arbitration schemes known in art could be implemented in embodiments herein. Alternatively, the arbitration scheme of the current invention might be implemented using an OpenFlow switch and an OpenFlow controller.

In the very particular embodiment of FIG. 3, computational unit 300 can further include notify/prefetch circuits 310c which can prefetch data stored in a buffer memory 310b in response to DMA slave module 310a, and as arbitrated by arbiter 310f. Further, arbiter 310f can access other portions of the computational unit 300 via a memory mapped I/O ingress path 310e and egress path 310g.

Referring to FIG. 3, a hardware scheduler can include a scheduling circuit 308b/n to implement traffic management of incoming packets. Packets from a certain source, relating to a certain traffic class, pertaining to a specific application or flowing to a certain socket are referred to as part of a session flow and are classified using session metadata. Such classification can be performed by classifier 308e.

In some embodiments, session metadata 308d can serve as the criterion by which packets are prioritized and scheduled and as such, incoming packets can be reordered based on their session metadata. This reordering of packets can occur in one or more buffers and can modify the traffic shape of these flows. The scheduling discipline chosen for this prioritization, or traffic management (TM), can affect the traffic shape of flows and micro-flows through delay (buffering), bursting of traffic (buffering and bursting), smoothing of traffic (buffering and rate-limiting flows), dropping traffic (choosing data to discard so as to avoid exhausting the buffer), delay jitter (temporally shifting cells of a flow by different amounts) and by not admitting a connection (e.g., cannot simultaneously guarantee existing service level agreements (SLAB) with an additional flow's SLA).

According to embodiments, computational unit 300 can serve as part of a switch fabric, and provide traffic management with depth-limited output queues, the access to which is arbitrated by a scheduling circuit 308b/n. Such output queues are managed using a scheduling discipline to provide traffic management for incoming flows. The session flows queued in each of these queues can be sent out through an output port to a downstream network element.

It is noted that conventional traffic management do not take into account the handling and management of data by downstream elements except for meeting the SLA agreements it already has with said downstream elements.

In contrast, according to embodiments a scheduler circuit 308b/n can allocate a priority to each of the output queues and carry out reordering of incoming packets to maintain persistence of session flows in these queues. A scheduler circuit 308b/n can be used to control the scheduling of each of these persistent sessions into a general purpose operating system (OS) 308j, executed on an offload processor 308i. Packets of a particular session flow, as defined above, can belong to a particular queue. The scheduler circuit 308b/n may control the prioritization of these queues such that they are arbitrated for handling by a general purpose (GP) processing resource (e.g., offload processor 308i) located downstream. An OS 308j running on a downstream processor 308i can allocate execution resources such as processor cycles and memory to a particular queue it is currently handling. The OS 308j may further allocate a thread or a group of threads for that particular queue, so that it is handled distinctly by the general purpose processing element 308i as a separate entity. The fact that there can be multiple sessions running on a GP processing resource, each handling data from a particular session flow resident in a queue established by the scheduler circuit, tightly integrates the scheduler and the downstream resource (e.g., 308i). This can bring about persistence of session information across the traffic management and scheduling circuit and the general purpose processing resource 308i.

Dedicated computing resources (e.g., 308i), memory space and session context information for each of the sessions can provide a way of handling, processing and/or terminating each of the session flows at the general purpose processor 308i. The scheduler circuit 308b/n can exploit this functionality of the execution resource to queue session flows for scheduling downstream. The scheduler circuit 308b/n can be informed of the state of the execution resource(s) (e.g., 308i), the current session that is run on the execution resource; the memory space allocated to it, the location of the session context in the processor cache.

According to embodiments, a scheduler circuit 308b/n can further include switching circuits to change execution resources from one state to another. The scheduler circuit 308b/n can use such a capability to arbitrate between the queues that are ready to be switched into the downstream execution resource. Further, the downstream execution resource can be optimized to reduce the penalty and overhead associated with context switch between resources. This is further exploited by the scheduler circuit 308b/n to carry out seamless switching between queues, and consequently their execution as different sessions by the execution resource.

According to embodiments, a scheduler circuit 308b/n can schedule different sessions on a downstream processing resource, wherein the two are operated in coordination to reduce the overhead during context switches. An important factor in decreasing the latency of services and engineering computational availability can be hardware context switching synchronized with network queuing. In embodiments, when a queue is selected by a traffic manager, a pipeline coordinates swapping in of the cache (e.g., L2 cache) of the corresponding resource (e.g., 308i) and transfers the reassembled I/O data into the memory space of the executing process. In certain cases, no packets are pending in the queue, but computation is still pending to service previous packets. Once this process makes a memory reference outside of the data swapped, the scheduler circuit (308b/n) can enable queued data from an I/O device 302 to continue scheduling the thread.

In some embodiments, to provide fair queuing to a process not having data, a maximum context size can be assumed as data processed. In this way, a queue can be provisioned as the greater of computational resource and network bandwidth resource. As but one very particular example, a computation resource can be an ARM A9 processor running at 800 MHz, while a network bandwidth can be 3 Gbps of bandwidth. Given the lopsided nature of this ratio, embodiments can utilize computation having many parallel sessions (such that the hardware's prefetching of session-specific data offloads a large portion of the host processor load) and having minimal general purpose processing of data.

Accordingly, in some embodiments, a scheduler circuit 308b/n can be conceptualized as arbitrating, not between outgoing queues at line rate speeds, but arbitrating between terminated sessions at very high speeds. The stickiness of sessions across a pipeline of stages, including a general purpose OS, can be a scheduler circuit optimizing any or all such stages of such a pipeline.

Alternatively, a scheduling scheme can be used as shown in U.S. Pat. No. 7,760,715 issued to Dalal on Jul. 20, 2010, incorporated herein by reference. This scheme can be useful when it is desirable to rate limit the flows for preventing the downstream congestion of another resource specific to the over-selected flow, or for enforcing service contracts for particular flows. Embodiments can include arbitration scheme that allows for service contracts of downstream resources, such as general purpose OS that can be enforced seamlessly.

Referring still to FIG. 3, a hardware scheduler according to embodiments herein, or equivalents, can provide for the classification of incoming packet data into session flows based on session metadata. It can further provide for traffic management of these flows before they are arbitrated and queued as distinct processing entities on the offload processors.

In some embodiments, offload processors (e.g., 308i) can be general purpose processing units capable of handling packets of different application or transport sessions. Such offload processors can be low power processors capable of executing general purpose instructions. The offload processors could be any suitable processor, including but not limited to: ARM, ARC, Tensilica, MIPS, StrongARM or any other processor that serves the functions described herein. Such offload processors have a general purpose OS running on them, wherein the general purpose OS is optimized to reduce the penalty associated with context switching between different threads or group of threads.

In contrast, context switches on host processors can be computationally intensive processes that require the register save area, process context in the cache and TLB entries to be restored if they are invalidated or overwritten. Instruction Cache misses in host processing systems can lead to pipeline stalls and data cache misses lead to operation stall and such cache misses reduce processor efficiency and increase processor overhead.

Also in contrast, an OS 308*j* running on the offload processors 308*i* in association with a scheduler circuit 308*b/n*, can operate together to reduce the context switch overhead incurred between different processing entities running on it. Embodiments can include a cooperative mechanism between a scheduler circuit and the OS on the offload processor 308*i*, wherein the OS sets up session context to be physically contiguous (physically colored allocator for session heap and stack) in the cache; then communicates the session color, size, and starting physical address to the scheduler circuit upon session initialization. During an actual context switch, a scheduler circuit can identify the session context in the cache by using these parameters and initiate a bulk transfer of these contents to an external low latency memory (e.g., 308*g*). In addition, the scheduler circuit can manage the prefetch of the old session if its context was saved to a local memory 308*g*. In particular embodiments, a local memory 308*g* can be low latency memory, such as a reduced latency dynamic random access memory (RLDRAM), as but one very particular embodiment. Thus, in embodiments, session context can be identified distinctly in the cache.

In some embodiments, context size can be limited to ensure fast switching speeds. In addition or alternatively, embodiments can include a bulk transfer mechanism to transfer out session context to a local memory 308*g*. The cache contents stored therein can then be retrieved and prefetched during context switch back to a previous session. Different context session data can be tagged and/or identified within the local memory 308*g* for fast retrieval. As noted above, context stored by one offload processor may be recalled by a different offload processor.

In the very particular embodiment of FIG. 3, multiple offload processing cores can be integrated into a computation FPGA 308. Multiple computational FPGAs can be arbitrated by arbitrator circuits in another FPGA 310. The combination of computational FPGAs (e.g., 308) and arbiter FPGAs (e.g., 310) are referred to as "XIMM" modules or "Xockets DIMM modules" (e.g., computation unit 300). In particular applications, these XIMM modules can provide integrated traffic and thread management circuits that broker execution of multiple sessions on the offload processors.

FIG. 3 also shows an offload processor tunnel connection 308*k*, as well as a memory interface 308*m* and port 308*l* (which can be an accelerator coherency port (ACP)). Memory interface 308*m* can access buffer memory 308*a*.

Having described various embodiments suitable for full bandwidth packet handling management operations, two example illustrating particular configurations for embodiments will now be described.

EXAMPLE 1

FIG. 4 illustrates a system 400 according to an embodiment. A system 400 can perform "Map-Reduce" based data search and analysis operations. A system 400 can provide data-intensive parallel computation in multiple servers or clusters of servers. In very particular embodiments, servers can be mounted in a same rack or different racks.

In one embodiment, a Map-Reduce data processing can be Hadoop, an open source program implemented in Java. Example applications for Hadoop or other Map-Reduce based data processing systems include processing crawled documents, web request log analysis, or general unstructured data search and analysis. In Map-Reduce data processing, data is initially partitioned across the nodes of a cluster and stored in a distributed file system (DFS). Data is represented as (key, value) pairs. The computation is expressed using two functions:

$$\text{Map}(k1,v1) \rightarrow \text{list}(k2,v2);$$

$$\text{Reduce}(k2,\text{list}(v2)) \rightarrow \text{list}(v3)$$

Input data can be partitioned and Map functions can be applied in parallel on all the partitions (called "splits"). A mapper is initiated for each of the partitions, which applies the map function to all the input (key, value) pairs. The results from all the mappers are merged into a single sorted stream. At each receiving node, a reducer fetches all of its sorted partitions during the shuffle phase and merges them into a single sorted stream. All the pair values that share a certain key are passed to a single reduce call. The output of each Reduce function is written to a distributed file in a distributed file system (DFS). A master node runs a Job-Tracker which organizes the cluster's activities. Each of the worker nodes runs a TaskTracker which organizes the worker node's activities. All input jobs are organized into sequential tiers of map tasks and reduce tasks. The Task-Tracker runs a number of map and reduce tasks concurrently and pulls new tasks from the JobTracker as soon as the old tasks are completed. All the nodes communicate results from the Map-Reduce operations in the form of blocks of data over the network using an HTTP based protocol. In implementations based on Hadoop, the Map-Reduce layer stores intermediate data produced by the map and reduce tasks in the Hadoop Distributed File System (HDFS). HDFS is designed to provide high streaming throughput to large, write-once-read-many-times files.

Hadoop can be more efficiently operated using inter-server communication and does not require redirection with a Top-of-Rack (TOR) switch. Servers equipped with offload processor modules, such as described herein and equivalent, can bypass a TOR switch through intelligent virtual switching of the offload processor modules associated with each server. In particular embodiments, such bypassing of a TOR switch can allow for improvements in processing of a shuffling step (communication of map results to the reducers).

Referring to FIG. 4, an input section 474 can fetch input data from a file system 488. Input data can be partitioned into splits 476) and parsed into records that contain initial (key, value) pairs 478. FIG. 4 shows how mappers 450 can operate map functions on splits 476. The results are communicated to the reducers 480 (shuffling 482/484). Instead of using HTTP for such communication, as can occur in conventional systems, shuffling can be performed using a "publish-subscribe" scheme. The results from the map steps are obtained by offload processor modules by performing DMA operations on the main memory of a system. The (key, value) pairs are then parsed by the offload processor modules and the key is published through a midplane switch fabric. Keys are identified (e.g., through content addressable memory), and forwarded to reducers 480 via virtual interrupts. The midplane switch can be collectively defined by offload processor modules. In particular embodiments, such a switch can drive and receive an entire system bus bandwidth (e.g., PCI-e 3.0 bandwidth of 240 Gbps), tightly connecting map steps with reduce steps. It is understood that such connected map steps can be via intra-rack communication and/or inter-rack communication.

EXAMPLE 2

Inter- and intra-rack communication according to embodiments described herein, or equivalents, can be useful for complex transport, data bandwidth intensive, frequent random access oriented, "light touch" processing loads for execution by multiple offload processor cores. In some embodiments, such processing tasks may not even require processing resources of a server processor core (e.g., x86 processor cores). In certain embodiments, such tasks may not require access to a server processor through a conventional I/O fabric, since an offload processor module can include suitable IO ports for Ethernet-like, Infiniband, or other commonly available rack or cluster interconnects. One such embodiment is shown in FIG. 5.

Figures 2, 3, 4, 5:
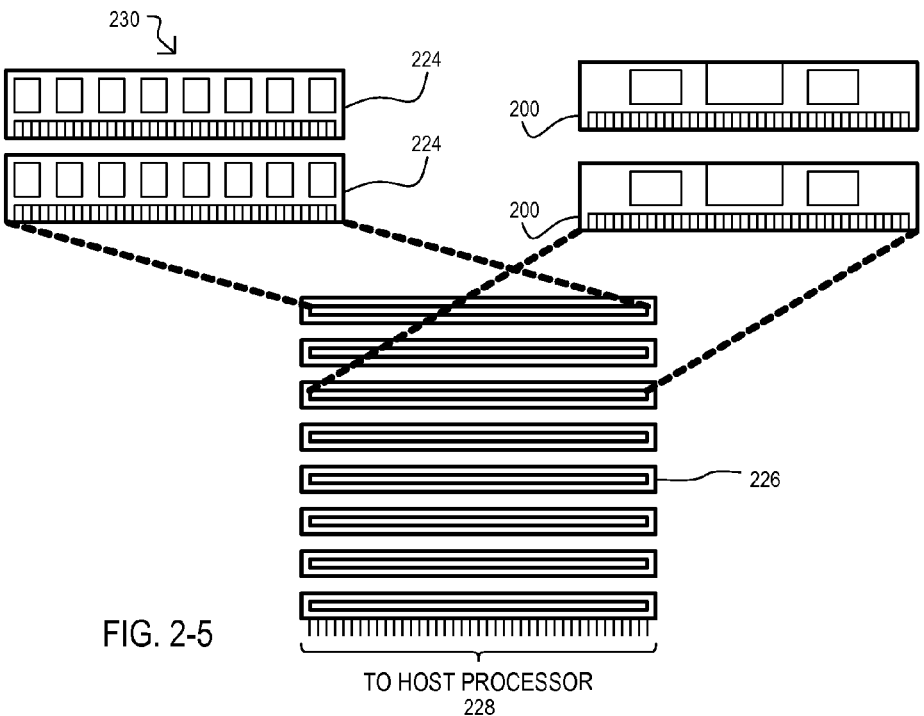
Figure 3:
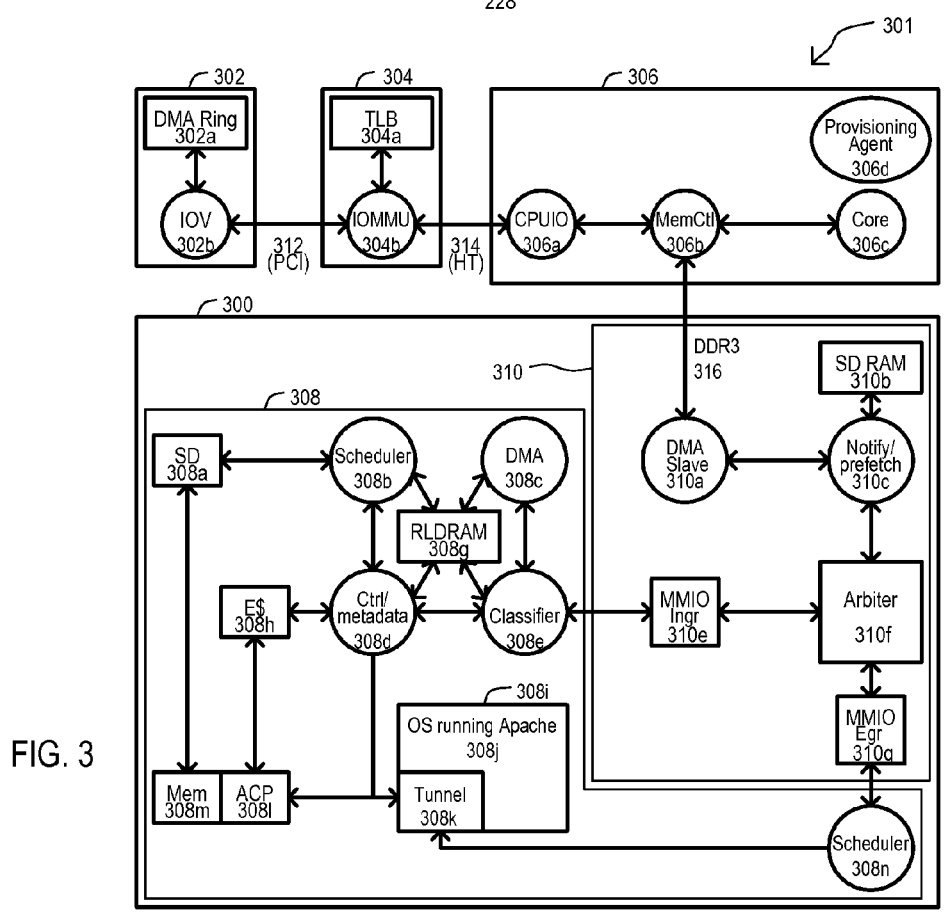
Figure 4:
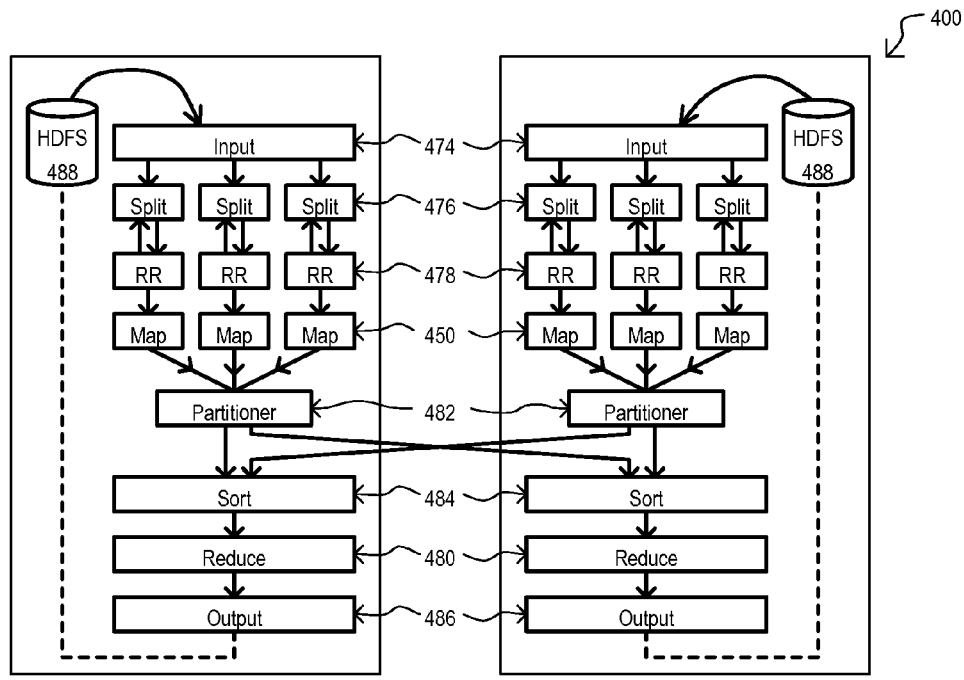
Figure 5:
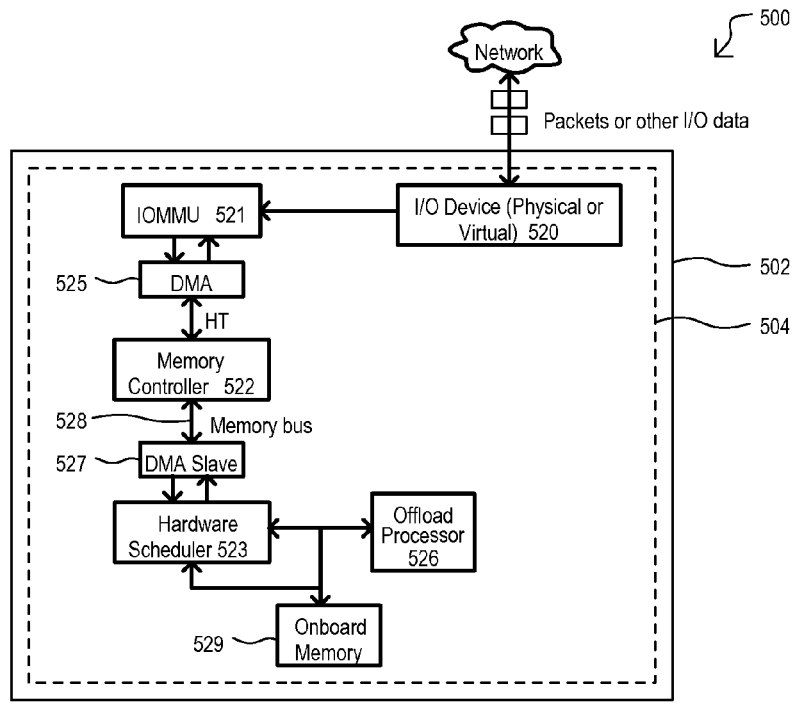

FIG. 5 shows a system 500 according to embodiment. A system 500 can include a server 502 that supports a memory bus connected offload processor module 504. The offload processor module 504 is able to directly process network packet operations, including but not limited to various network overlay operations on packet or other I/O data, without necessarily requiring any control by host processor(s) or memory of the server 502.

Packet or other I/O data can be received at an I/O device 520. An I/O device 520 can be physical device, virtual device or combination thereof. An IOMMU 521 can map received data to physical addresses of a system address space. DMA master 525 can transmit such data to such memory addresses by operation of a memory controller 522. Memory controller 522 can execute data transfers over a memory bus 528 with a DMA Slave 527. Upon receiving transferred I/O data, a hardware scheduler 523 can schedule processing of such data with an offload processor 526. In some embodiments, a type of processing can be indicated by metadata within the I/O data. Further, in some embodiments such data can be stored in an onboard memory 529. According to instructions from hardware scheduler 523, one or more offload processors 526 can execute computing functions in response to the I/O data, including but not limited to operations on packets redirected for network overlay. In some embodiments, such computing functions can operate on the I/O data, and such data can be subsequently read out on memory bus via a read request processed by DMA Slave 527.

Figure 6:
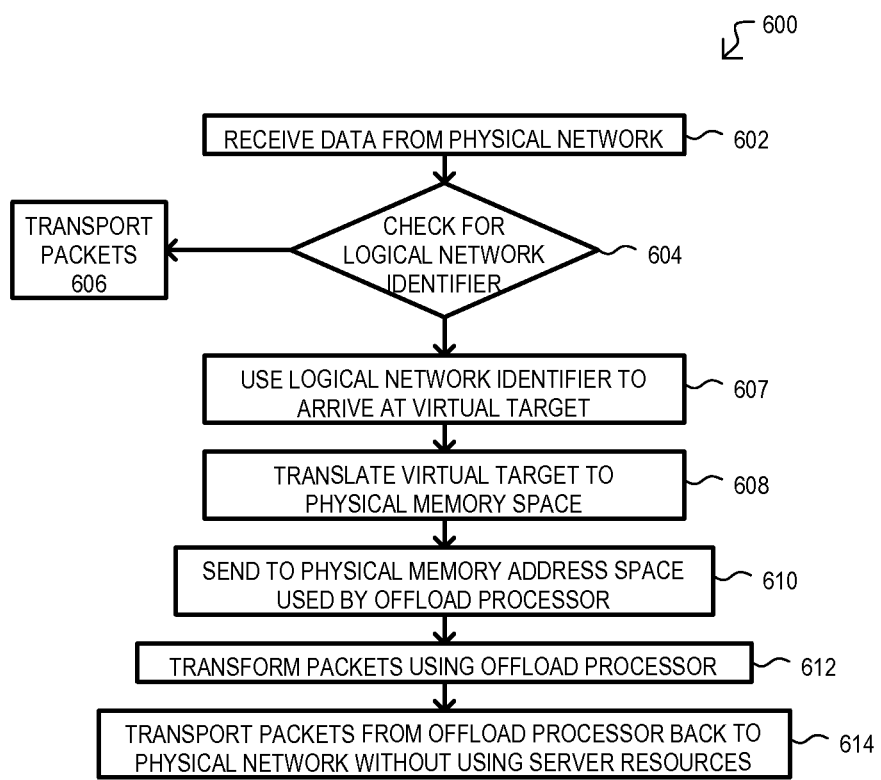

FIG. 6 is a flow chart illustrating an exemplary method 600 of providing inter- and intra-rack communication network overlay services, without access to server resources including I/O, memory, or processors. Data can be received from a physical network (602). Such an action can include receiving data from a network, including but not limited to a wired, wireless, optical, switched, or packet based network. Packets can be checked for a logical network identifier (604). Packets without a logical network identifier (or without particular logical network identifier(s)) (No from 604) can be transported as required by protocol (step 606).

Packets with a logical network identifier (Yes from 604) can be segregated for further processing. Such processing can include determination of a particular virtual target (607) on the network, and the appropriate translation into a physical memory space (608). The packet is then sent to a physical memory address space used by an offload processor (610). Packets can be transformed (612) in some manner by the offload processor, and transported back onto the physical network without using server resources (614).

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. An inter-rack server system for a packet processing, comprising:
    a plurality of servers arranged into multiple racks, each server including a system bus, a memory bus, and a memory controller;
    a plurality of top of rack (TOR) units connected to the servers, each TOR unit configured to operate as a TOR switch connecting each of the racks to another of the racks by TOR connections; and
    a plurality of offload processor modules, each offload processor module being directly connected to the memory bus of one of the servers and configured to receive packet data for processing via the memory bus by operation of the corresponding memory controller writing to predetermined memory addresses, each offload processor module having
        an input-output (IO) port configured to transmit and receive packet data, and
        multiple offload processors configured to process packet data received by the offload processor module via the memory bus and via the IO port; wherein
    a first offload processor module on a first server on a first rack is connected directly to a second offload processor module on a second server on a second rack, with a module connection provided through respective IO ports, the module connection being different than any TOR connection.

2. The system of claim 1 wherein each offload processor module is physically connected to a memory socket attached to the memory bus of the corresponding server.

3. The system of claim 1 wherein each offload processor modules is physically connected to a dual in line memory module (DIMM) socket of the memory bus of the corresponding server.

4. The system of claim 1 wherein multiple offload processor modules are connected to multiple memory sockets on the memory bus of at least one of the servers.

5. The system of claim 1 wherein at least one offload processor module is configured as a midplane switch to forward network packets to one or more of the other multiple offload processor modules.

6. The system of claim 1 wherein at least one offload processor is configured to direct network packets to one or more of the other offload processors based on availability of the offload processors.

7. The system of claim 1, wherein each offload processor module further comprises a scheduler configured to determine a routing of network packets through respective IO ports of the offload processor modules based on availability of offload processors of the offload processor module.

8. An inter-rack server system for a packet processing, comprising:
a plurality of servers arranged into multiple racks, each server including a system bus and a main processor coupled to a memory bus by a memory controller;
a plurality of top of rack (TOR) units connected to each of the servers, with each TOR unit configured as a TOR switch connecting each of the racks to another of the racks by TOR connections; and
a plurality of offload processor modules, each offload processor module being directly connected to the memory bus of one of the servers and having an input-output (IO) port and multiple offload processors, the offload processors configured to process
packet data received via the IO port of the offload processor module, and
packet data received via the memory bus of the server by operation of the corresponding memory controller writing data to predetermined memory addresses; wherein
each of the servers includes multiple offload processor modules, with a first offload processor module of a first server connected directly to a second offload processor module of a second server, by a module connection that includes their respective IO ports, the module connection being different than any TOR connection.

9. The system of claim 8 wherein each offload processor module is physically connected to a memory socket attached to the memory bus of the corresponding server.

10. The system of claim 8 wherein each offload processor modules is physically connected to a dual in line memory module (DIMM) socket of the memory bus of the corresponding server.

11. The system of claim 8 wherein multiple offload processor modules are connected to multiple memory sockets on the memory bus of at least one of the servers.

12. The system of claim 8 wherein at least one offload processor module is configured as a midplane switch to forward network packets to one or more of the other multiple offload processor modules.

13. The system of claim 8 wherein at least one offload processors are configured to direct network packets to one or more of the other offload processors based on availability of the offload processors.

14. The system of claim 8, wherein each offload processor module further comprises a scheduler configured to determine a routing of network packets through respective IO ports of the offload processor modules based on availability of offload processors of the offload processor module.

* * * * *